June 17, 1941.    A. GRONERT    2,245,664

DRYING SHAFT FOR GRANULAR LOOSE MATERIAL

Filed July 2, 1938

Inventor:
August Gronert,
by Walter S. Hinton
Attorney.

Patented June 17, 1941

2,245,664

UNITED STATES PATENT OFFICE 2,245,664

DRYING SHAFT FOR GRANULAR LOOSE MATERIAL

August Gronert, Furstenwalde-on-the-Spree, Germany

Application July 2, 1938, Serial No. 217,151
In Germany December 8, 1937

6 Claims. (Cl. 34—62)

This invention relates to a drying shaft for granular loose material such as grain, maize, peanuts and the like, which trickles downwards in a shaft and is dried on its passage by air currents produced by a blower.

As compared with the known drying shafts the invention is characterized in that a casing containing the blower and provided with suction and pressure sections is arranged in the interior of the drying shaft in such a manner that it is surrounded on all sides by the loose material. The blower casing preferably forms within the loose material an axially directed shaft with Venetian blind or sieve-like walls. Thus merely by employing suction and pressure sections on the blower it is possible to pass therethrough hot air for drying and cold air for cooling the loose material and also circulating air, without requiring separate pipe conduits. The blower casing is preferably lengthened on the suction and pressure sections in such a manner that the portion below the blower forms a suction chamber for supplying hot air into the upper part and cold air into the lower part and the portion above the blower forms a pressure chamber for supplying preheated, exhaust and circulating air.

The motor for the blower may be arranged outside the drying shaft but, according to another feature of the invention, it may be also arranged in the interior of the drying shaft preferably in the suction chamber of the blower casing.

The chief advantage of the invention, whose other features are shown in the drawing and ascertained in the description of the drawing, consists in that, by the omission of long pipe conduits, losses of heat from the hot air sucked in by the blower are avoided, the hot air sucked by the blower no longer comes into contact with the outer wall of the shaft but gives up its heat only to the desired initial temperature and entirely to the loose material and takes up moisture in its stead. The air does not need to pass along any tortuous paths on its passage through the loose material but penetrates through the loose material on a regular path, so that it is possible to attain with only one blower the following very favourable effects: preheating to sweating, drying, cooling and circulation of air. Finally a favourable degree of efficiency is attained by the blower arranged in a particular manner in the interior of the drying shaft.

An embodiment of the invention is illustrated by way of example in the accompanying drawing, in which.

Figure 1:
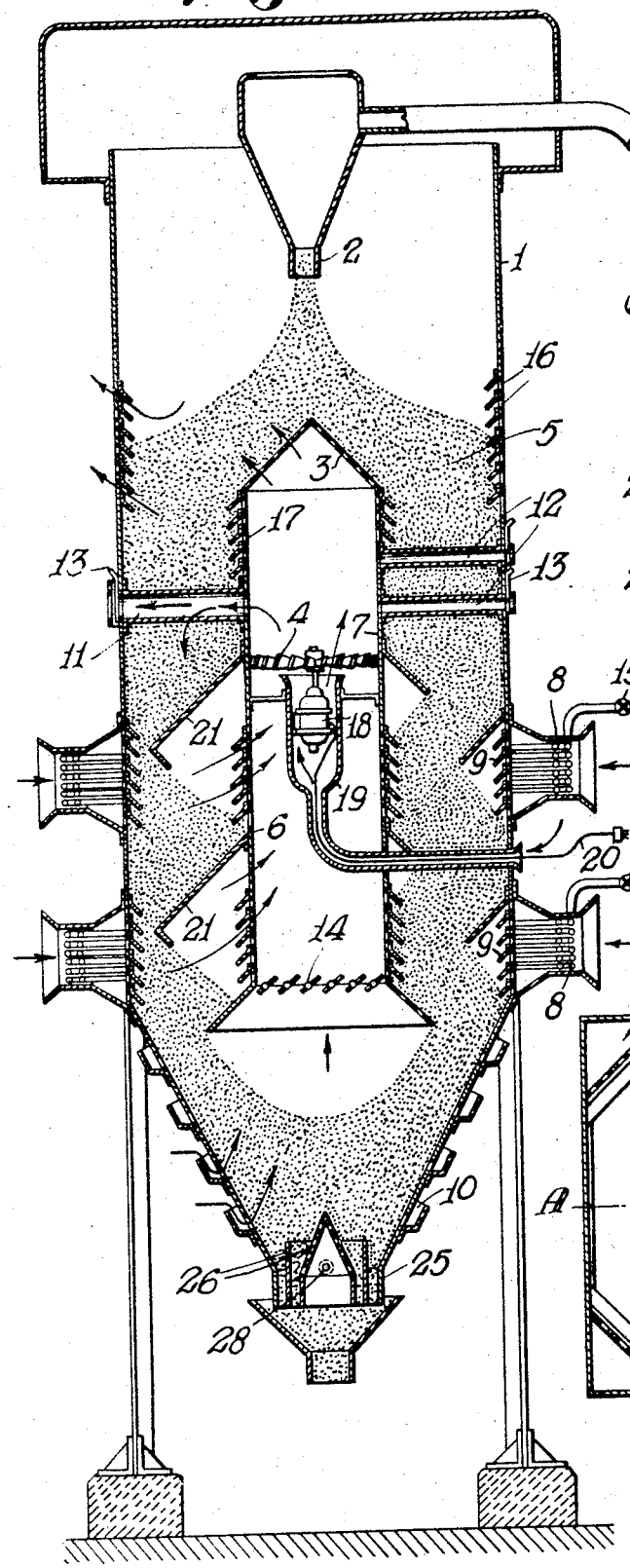
Fig. 1 shows a drying shaft in longitudinal section.

A casing 3 accommodating a helical blower 4 is arranged in the interior of a drying shaft 1 into which the material to be dried is charged at 2, and is surrounded on all sides by the loose heaped material 5. The blower casing 3, which forms an axially directed shaft in the interior of the drying shaft 1 has a suction section 6 and a pressure section 7 with perforated walls, shown in the drawing as like a Venetian blind or sieve, in order to allow the passage of air but prevent the penetration of the loose material.

By arranging the blower in the interior of the shaft 1, three zones are formed, namely a sweating zone in the upper portion of the shaft, a drying zone in the middle of the shaft and a cooling zone at the lower end thereof. Air heaters 8 are provided on the outer side of the shaft in the drying zone and protected against the penetration of loose material by Venetian blind or sieve-like walls 9. These air heaters consist, for example, of steam pipes on which the air brushing past them and entering the drying shaft is heated. Venetian blind or pocket shaped apertures 10 are provided in the cooling zone in the lower portion of the shaft for the admission of cooling air. In the sweating zone the pressure section 7 of the blower casing 3 communicates with the atmosphere by passages 11 or 12 closed all round or open at the under side, which passages have shut-off elements 13 at their outlet ends to allow the whole or part of the air coming from the pressure section of the blower casing to escape into the atmosphere.

When the shaft 1 is charged and the blower 4 in operation, a vacuum is produced in the suction chamber 6 with the result that the hot air is drawn through the loose material into the suction chamber and the loose material is dried. At the same time cold air is sucked through the apertures 10 and again cools the loose material descending in the shaft. The proportions of hot and cold air can be accurately regulated and adjusted by setting from the outside throttling devices 14 and steam valves 15 on the air heaters 8. The mixed air entering the suction chamber 6, after passing through the loose material, passes through the blower 4 into the pressure chamber 7 and then either passes into the open through the passages 12, 13, preheating the loose material in the upper end of the shaft 1, or, if the passages are closed, passes out of the pressure chamber 7 through the Venetian blind or sieve-like apertures 17 of the pressure section, through the loose material and then escapes into the open through the apertures 16 in the drying shaft, the air on its passage giving up any heat it may possess to the loose material. A portion of this hot air flowing through the passages 12, 13 or through the apertures 17 in the pressure section 7 again passes as circulating air through the loose material in downward direction and once more reaches the blower 4 through the suction section 6. By adjusting and setting the shut-off devices 13 and, if necessary shut-off devices provided on the outlet apertures 16, the proportions of exhaust and circulation air can be regulated and set to the most economical value.

In order to avoid excessively long connecting shafts, the motor 18 for the blower 4 is, in the examples illustrated, arranged in the interior of the drying shaft 1, namely in the suction chamber 6 of the blower casing 3. To protect the motor against hot and moist air, it is surrounded by a sleeve 19 which communicates with the outer air so that the motor is continually flushed with fresh air and this connection serves at the same time as guide and protecting tube for the connection cable 20 of the motor.

So as to obtain a thorough mixing of the material, guide plates are arranged between the suction element 6 and the outer wall of the drying shaft 1. These guide plates are preferably formed by box-shaped hollow girders 21, which continually deflect a portion of the descending loose material from the middle of the shaft towards the outer wall thereof and at the same time support the blower casing 3.

Figure 2:
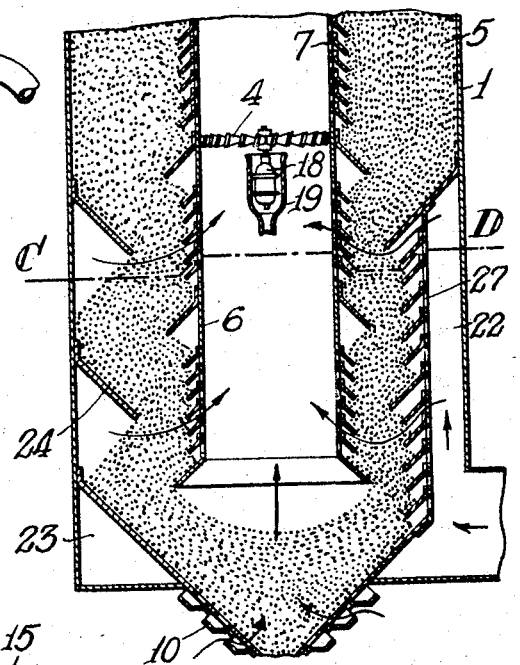
Fig. 2 is a longitudinal section of a shaft of slightly modified form of construction, taken on line A—B of Fig. 3.
Figure 3:
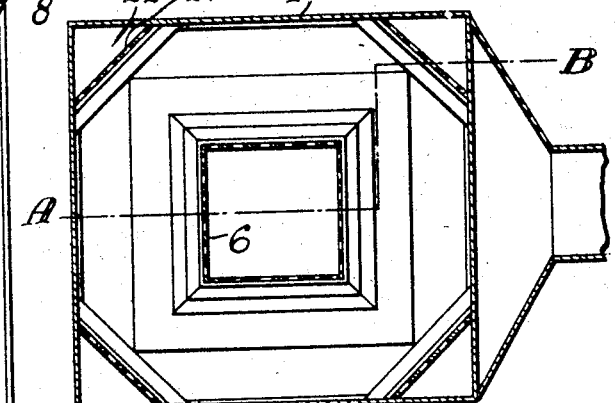
Fig. 3 is a cross-section taken on line C—D of Fig. 2.

The drying may be carried out with the aid of any kind of air heater and is not limited to the use of steam air heaters. If, for example, flue gases are directly used for the drying, the four corners 22 of the shaft which are separated from the drying zone by Venetian blind or sieve-like walls 27, as shown for example in Figs. 2, 3, may serve for conducting the flue gases, the passages formed at the corners of the shaft being if necessary connected by an annular passage 23 (Fig. 2). According to Fig. 2 baffles 24 are provided in the shaft-wall for obtaining a better distribution of the loose material and air.

The delivery mouth 25 at the lower end of the drying shaft may be constructed in any suitable manner and if desired provided with insertions 26 (auxiliary shut-off devices) adjustable from the outside by a suitable mechanism 28, and which enable dry material to be drawn off selectively from the outer or from the central portion of the shaft or in the desired mixture.

I claim:

1. A drying apparatus for granular loose material such as grain, maize, peanuts, comprising a shaft adapted to receive said material, an elongated casing substantially shorter than and interiorly of said shaft and coaxially therewith so as to be surrounded laterally as well as at its top and its bottom by the material within said shaft, a blower substantially in the middle portion of said casing, first means to permit cold air to pass through the material in the lowest portion of said shaft into the lower portion of said casing, second means on a level above said first means to permit heated air to pass through the material in said shaft into said casing in a zone substantially between said lowest shaft portion and the level of said blower, and third means above said second means to permit said cold and said heated air sucked in by said blower to be forced by the latter through the upper portion of said casing and through the material in said shaft in a zone substantially above said blower.

2. A drying apparatus for granular loose material such as grain, maize, peanuts, comprising a shaft adapted to receive said material, an elongated casing substantially shorter than and interiorly of said shaft and substantially coaxial therewith so as to be surrounded laterally as well as at its top and its bottom by the material within said shaft, a blower substantially in the middle portion of said casing, and so constructed and arranged as to produce an air current in a substantially upward direction, said casing being provided with apertures in its wall above and below said blower, said shaft having three sets of apertures one above the other, the two lower sets constituting inlets arranged substantially below the level of said blower, the third set constituting outlets arranged substantially above the level of said blower, the apertures of said lowest and said third set communicating with the atmosphere, and means for supplying heated air to said set located between said lowest and said third set.

3. An apparatus as claimed in claim 2 further comprising adjustable shutting means for at least some of said apertures in the lower portion of said casing to regulate the admission of cool air to said shaft.

4. An apparatus as claimed in claim 2 further comprising a by-pass from the upper portion of said casing to the atmosphere, and a shutter for said by-pass.

5. An apparatus as claimed in claim 1 further comprising girders arranged substantially between the lower portion of said casing and the wall of said shaft, said girders being so constructed and arranged as to deflect the loose material from said casing towards the periphery of said shaft and to support the casing in said shaft.

6. A drying apparatus for granular loose material such as grain, maize, peanuts, comprising a shaft of substantially square cross-section, to receive said material, an elongated casing interiorly of said shaft and substantially coaxial therewith so as to be surrounded by the material within said shaft, a blower substantially in the middle portion of said casing, the lower portion of said casing constituting a suction chamber and the upper portion a compression chamber for said blower, said casing having apertures in the walls of its suction chamber portion and in its compression chamber portion, said shaft having a set of air outlet apertures substantially above the level of said blower and a set of inlet apertures for cold air in its lowest portion, perforated plates arranged across the corners of said shaft in a zone between said lowest shaft portion and the level of said blower, so as to form passages along the shaft corners, and a conduit connecting said passages, said conduit and said passages constituting a means for admitting heated air through the perforations of said plates.

AUGUST GRONERT.